United States Patent [19]

Sing

[11] Patent Number: 4,748,344

[45] Date of Patent: May 31, 1988

[54] PORTABLE POWER SUPPLY CARRIER

[76] Inventor: Peter Sing, 43 Donny Brook Rd., Scarsdale, N.Y. 10583

[21] Appl. No.: 29,525

[22] Filed: Mar. 23, 1987

[51] Int. Cl.$^4$ .............................................. H02J 7/00
[52] U.S. Cl. ................................. 307/150; 307/149; 307/151; 320/2
[58] Field of Search .............. 307/71, 150, 151, 149; 320/2; 315/76; 224/163, 253, 902; 363/13, 15, 16, 34

[56] References Cited

U.S. PATENT DOCUMENTS

| | | | |
|---|---|---|---|
| 3,274,476 | 9/1966 | Wildum | 224/902 X |
| 3,308,419 | 3/1967 | Rohowetz et al. | 307/64 X |
| 3,828,201 | 8/1974 | Allen | 307/150 |
| 3,919,615 | 11/1975 | Niecke | 307/150 X |
| 4,108,341 | 8/1978 | Pettinger | 307/150 X |
| 4,300,087 | 11/1981 | Meisner | 307/150 X |
| 4,316,097 | 2/1982 | Reynolds | 307/66 |

Primary Examiner—William M. Shoop, Jr.
Assistant Examiner—Paul Ip
Attorney, Agent, or Firm—Nathaniel Altman

[57] ABSTRACT

Portable power supply carrier comprises an internally wired belt to be worn around a user's waist, the belt having pairs of electrical connectors spaced along its length for operatively engaging a plurality of battery holders which are removably supported on the belt. In its simplest form, the power supply carrier uses conventional batteries to provide a single preselected DC voltage through the belt's wiring to a power output jack; other more complex forms of the carrier may include a converter to supply a choice of DC and AC voltages either to multiple power outlets or to a voltage selector switch controlling a single output jack. An input terminal for reenergizing rechargeable batteries while connected to the power belt carrier also may be included.

19 Claims, 1 Drawing Sheet

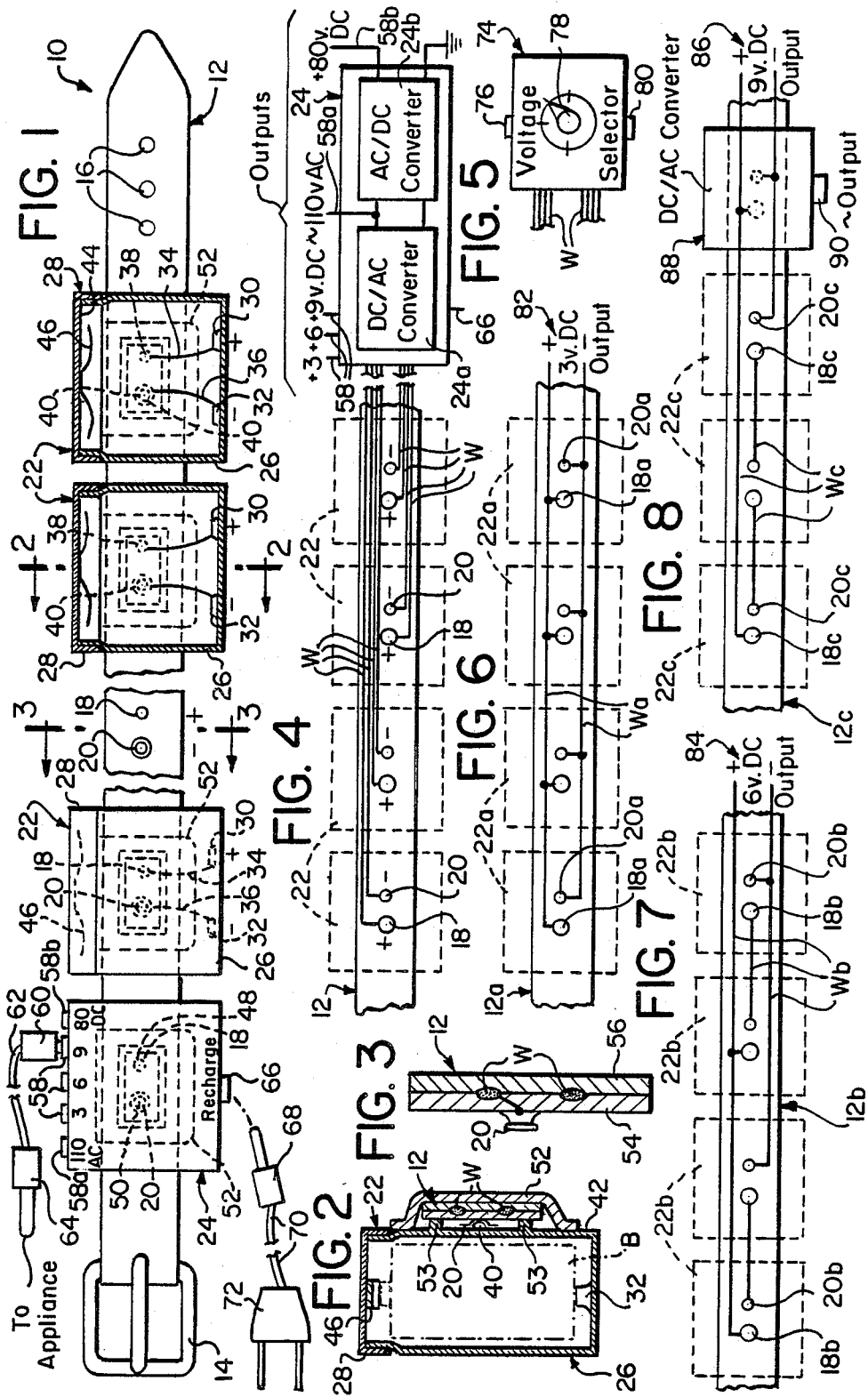

PORTABLE POWER SUPPLY CARRIER

BACKGROUND OF THE INVENTION

Portable electrical appliances require an adequate supply of power from batteries, transformers, converters, etc., which frequently are heavy, bulky, awkward to carry and tiring to support. Devices such as miners' headlamps, flash- and flood-lights, small power tools and the like have the added bulk and weight of their power supplies to be carried; even portable radios and cassette players are made heavier and more tiresome to carry by their enclosed batteries.

It is the principal object of this invention to provide a convenient carrier for power source units, the weight and bulk of which are well distributed and comfortably supported with minimum strain on the carrier's user. It is also an object of this invention to make available on the power carrier a selected range of voltages, so that the carrier may be used selectively to energize a wide variety of portable electrical appliances. Still another object of this invention is to provide for simple recharging when rechargeable batteries are being used in the carrier.

SUMMARY OF THE INVENTION

A carrier for operatively supporting electric batteries, preferably of the rechargeable type, and for supplying the current necessary for operating various portable electrical appliances, comprises an internally wired belt to be worn around the waist of a user. The belt has a spaced series of paired electrical connectors mounted thereon and functionally attached to the belt's internal wiring. Each pair of connectors may be operatively engaged by either battery holders, converters or the like. The connectors may be spaced along the full span of the belt for balanced distribution of the weight and bulk of the supported batteries and converters, and thus for the maximum comfort of the carrier's wearer.

The simplest embodiments of the power-carrying belt of this invention have the internal belt wiring so arranged that the belt connectors are operatively linked either in series, in parallel or in a combination of both. With appropriate batteries in place, a single preselected direct current voltage is thereby supplied to a power outlet for connecting and energizing an electrical appliance with a matching voltage requirement. By adding switch or converter elements to an appropriately wired belt circuit, power source embodiments with multiple direct current as well as alternating current outputs may be realized. Provision may be made for rechargeable batteries used in the portable power carrier to be revitalized by overnight recharging without removal or disconnection from the belt.

The best modes of practising this invention as now contemplated will be described illustratively in detail in connection with the accompanying drawings, wherein:

SHORT FIGURE DESCRIPTION OF THE DRAWINGS

FIG. 1 is a front elevational view, partially in section, of a portable power carrier in accordance with the concepts of this invention;

FIG. 2 is a sectional view taken along line 2—2 of FIG. 1;

FIG. 3 is a sectional view taken along line 3—3 of FIG. 1;

FIG. 4 is a diagrammatic partial view of a portable power carrier;

FIG. 5 is a fragmentary detail view of a voltage selector for use in an alternate embodiment of a power carrier;

FIGS. 6 and 7 are diagrammatic wiring arrangements of portable power carriers, each providing for a single DC current supply; and FIG. 8 is a diagrammatic wiring arrangement for another power carrier embodiment which combines a single DC current supply with an optional AC output.

DESCRIPTION OF THE PREFERRED EMBODIMENTS

The portable power carrier device 10 of FIG. 1 comprises belt member 12 carrying conventional belt buckle 14 at one end and buckle-engaging holes 16 positioned adjacent to belt 12's opposite end. Spaced along the length of belt 12 and mounted thereon are multiple pairs of electrical connectors 18, 20 for operatively engaging such elements as battery holders 22 and converter 24. Each battery holder 22, as shown in FIG. 1, is dimensioned to accommodate two conventional AA size 1.5 volt dry cell batteries in the usual manner; it will be apparent that battery holders 22 may be readily adapted to accommodate other sizes of conventional dry cell batteries. In the interest of clarity, however, this disclosure will confine itself to the 1.5 volt size.

As may be seen in FIGS. 1 and 2, each battery holder 22 comprises housing 26 and cover member 28. The inside bottom surface of housing 26 carries battery contacts 30 and 32, operatively connected by wires 34 and 36 respectively to fastening elements 38 and 40, which are fixed on the rear wall 42 of casing 26. Fastening elements 38 and 40 are each engaged with complementary mating electrical connectors 18 and 20, respectively, and together maintain each battery holder 22 in operative contact with internally wired belt 12.

Battery holder cover member 28, on its inner top surface 44, supports double spring contact 46, which serves to complete the electrical circuit when holding two dry cell batteries B (one is shown in phantom in FIG. 2) side by side in opposite vertical orientation to each other and thus connected in series. In this manner, when 1.5 volt dry cell batteries are used, as illustrated, each battery holder 22 provides carrier belt 12 with a 3 volt power source. The current from this source is thus made available to converter 24, which is operatively attached to belt 12 in exactly the same fashion as each battery holder 22, with fastening elements 48 and 50 of converter 24 engaging complementary mating connectors 18 and 20 of belt 12 respectively.

Battery holders 22 (and similarly converter 24) are further supported on belt 12 by loop flaps 52, best seen in FIG. 2, which are removably secured above and below belt 12 to rear wall 42 of holder 22 so as to maintain belt 12 resting against belt spacing ribs 53 projecting rearwardly from wall 42 of holder 22. Loop flaps 52 may be held conveniently in place, for example, by Velcro strips (not shown) and serve to insulate and protect the electrical connector-fastener contact elements 18-38, 20-40 (and 18-48, 20-50).

Belt 12, as seen in FIGS. 2 and 3, may be of laminated construction, with layers 54 and 56 encompassing and insulating clusters of conduit wires W which carry current from batteries B between electrical connectors 18, 20 to and from converter 24. Wires W, which have been omitted from FIG. 1 for reasons of clarity, may be distributed between laminates 54, 56 in a manner different from that shown in FIGS. 2 and 3, if desired; specific wiring patterns will be discussed hereinafter in connection with FIGS. 4–8.

Converter 24 is equipped with a plurality of output jacks 58, each wired to a selected combination of battery holder 22 power sources connected either in series, parallel or both. As illustrated, output jacks 58, which supply 3, 6 and 9 volt power are directly fed from batteries B through belt 12; converter 24, through its DC/AC converter portion 24a (see FIG. 4) feeds output jack 58a with 110 volts AC; and reconversion of the power by AC/DC converter portion 24b (FIG. 4) provides output jack 58b with 80 volts DC.

Current may be tapped from portable power carrier 10 in FIG. 1 by inserting plug 60 of double-ended connecting cord 62 into the jack 58 which corresponds to the voltage requirement of the appliance to be energized, while opposite end plug 64 of cord 62 is inserted into the appliance. It is intended that power carrier 10 be available for use on a regular basis each day, whether for duty or pleasure, and with a minimum of handling or maintenance; to this end, converter 24 is equipped with recharging jack 66, to be employed when rechargeable dry cell batteries B are contained in battery holders 22. By inserting plug 68 of recharging cord 70 into jack 66, and wall plug 72 into a conventional wall socket (not shown), all the batteries B contained in holders 22 of carrier 10 may be recharged together overnight, for example, without any disassembly or removal from device 10 being required.

FIG. 4 diagrammatically illustrates portable power carrier 10 operatively supporting four battery holders 22 and having electrical connectors 18, 20 wired independently and feeding individually into converter 24. Converter 24 comprises DC/AC converter 24a, AC/DC converter 24b, a plurality of outputs 58, recharging input 66 and internal wiring (not shown) for transmitting the currents brought by belt wiring W to outputs 58 and input 66, combined in series or parallel to meet the voltage requirements of each terminal.

Voltage selector 74 of FIG. 5 represents a converter similar in function to, and optionally a replacement for, converter 24 of FIGS. 1 and 4. However, voltage selector 74 has only a single output jack 76, the output of which is controlled and set by turning the knob of selector switch 78 to the desired voltage. Recharging jack 80 is also provided. Selector 74 may be attached to belt 12 in the manner described for converter 24 in FIG. 1, or alternatively may be adapted to serve the dual function of converter and belt buckle (not shown).

FIG. 6 shows diagrammatically a wired belt 12a for supplying a a single voltage, therefore requiring no converter. In this embodiment, electrical connectors 18a, 20a, operatively engaging four battery holders 22a, are connected in parallel by wiring Wa, which furnishes 3 volts DC power to output 82.

The wired belt 12b of FIG. 7, similar in most respects to belt 12a of FIG. 6, has wiring Wb running between connectors 18b, 20b and output 84, in a configuration which combines series and parallel connections. This arrangement supplies 6 volts DC power from four battery holders 22b to output 84.

FIG. 8 diagrammatically shows belt 12c with three battery holders 22c engaging electrical connectors 18c, 20c, which are connected in series to provide 9 volts DC power both to DC output 86 and to DC/AC converter 88, for supplying alternating current to output jack 90.

Various embodiments of the portable power supply carrier of this invention have been described which can meet a broad range of power requirements, from a single DC supply to a preselected group of both DC and AC outputs, all supported comfortably about the user's waist. It will be apparent to those skilled in the art that many combinations, modifications and substitutions other than those described illustratively above may be made without departing from the spirit and concepts of this invention, which are defined and limited only by the scope of the ensuing claims.

What is claimed is:

1. Portable power supply carrier for use in energizing electrically operated appliances and instruments, which comprises:
    a belt to be worn around a user's waist, said belt having electrical conduit means incorporated therein, said electrical conduit means being insulated by said belt;
    securing means attached to and for maintaining said belt removably in place on the user;
    a plurality of electrical connector-fasteners externally mounted in pairs at spaced intervals along the length of said belt, said connector-fasteners being electrically connected to said electrical conduit means;
    a plurality of electrical batteries for providing power to the portable power supply carrier;
    a plurality of battery holders to be mounted removably on said belt for carrying said electrical batteries and connecting said batteries electrically to said electrical conduit means;
    complementary mating fastening means externally mounted in pairs on said battery holders, said fastening means being electrically connected to said batteries held in said battery holders, said fastening means being capable of mechanical and electrical attachment each to a corresponding mating one of said electrical connector-fasteners on said belt; and
    output terminal means mounted on said belt for operative power-transferring attachment to the electrically operated appliance to be energized and operated, said output terminal means being electrically connected to said electrical conduit means whereby said electrical connector-fasteners are electrically interconnected with said output terminal means so that current from said electrical batteries held in said battery holders is transmitted through said electrical conduit means and carried to said output terminal means for energizing the electrical appliance attached thereto.

2. Portable power supply carrier as defined in claim 1, wherein said belt is of laminated construction and insulatingly carries said electrical conduit means distributed between the layers of said belt.

3. Portable power supply carrier as defined in claim 1, wherein each of said battery holders is capable of carrying a pair of said batteries and of electrically connecting said pair of said batteries in series to form a single power unit source.

4. Portable power supply carrier as defined in claim 3, wherein said electrical batteries each has a strength of 1.5 volts.

5. Portable power supply carrier as defined in claim 3, wherein each of said battery holders comprises:
    a housing;

a pair of electrical battery contacts mounted on the inner surface of the bottom wall of said housing;

a cover member fitting on and enclosing said housing;

a spring battery contact mounted on the inner surface of the top wall of said cover member, said spring contact being capable of holding of said electrical batteries in said battery holder in series connected engagement; and electric wiring contained within said battery holder housing and connecting each of said pair of electrical contacts to one of said complementary mating fastening means.

6. Portable power supply carrier as defined in claim 1, wherein each of said battery holders has a pair of said complementary mating fastening means mounted on its back wall, and each of said battery holders has spacing ribs projecting rearwardly from said back wall for positioning said belt with respect to said battery holder.

7. Portable power supply carrier as defined in claim 6, further comprising a plurality of loop-forming flaps, at least one end of each of said flaps being mounted removably on said back wall of each of said battery holders, said belt being held firmly against said spacing ribs of said battery holders by said flaps overlying said belt so that said electrical connectors, mechanically and electrically joined with said complementary mating fastening means, are covered and protected by said flaps.

8. Portable power supply carrier as defined in claim 4, wherein said electrical conduit means is so arranged that said single power units mounted in said battery holders on said belt are connected in parallel to provide a DC voltage of 3 volts to said output terminal means.

9. Portable power supply carried as defined in claim 4, wherein said electrical conduit means is so arranged that said single power units mounted in said battery holders on said belt are connected partially in parallel and partially in series to produce a DC voltage of 6 volts at said output terminal means.

10. Portable power supply carrier as defined in claim 4, wherein said electrical conduit means is so arranged that said single power units mounted in said battery holders on said belt are connected in series to provide a DC voltage of 9 volts to said output terminal means.

11. Portable power supply carrier as defined in claim 1, wherein said electrical conduit means is so arranged that said electrical batteries are connected both in series and in parallel to make selectively available direct currents of more that one voltage to said output terminal means.

12. Portable power supply carrier as defined in claim 1, further comprising:

an electrical current converter; and a pair of said complementary mating fastening means externally mounted on said converter for attachment each to a corresponding one of said electrical connector fasteners on said belt, said electrical conduit means being arranged to connect said battery holders to said converter and said converter to said output terminal means, so that alternating current is provided at said terminal means.

13. Portable power supply carrier as defined in claim 12, wherein said converter has the capacity not only to convert direct current from said batteries into alternating current, but also to reconvert said alternating current back to a direct current of selected voltage and to supply both said alternating and said direct currents selectively to said output terminal means.

14. Portable power supply carrier as defined in claim 12, further comprising said electrical conduit means being so arranged that said electrical batteries are connected both in series and in parallel to make direct current of more than one voltage as well as alternating current selectively available at said output terminal means.

15. Portable power supply carrier as defined in claim 1, wherein said output terminal means comprises a plurality of output jacks, each of said output jacks being connected to said electrical batteries through said electrical conduit means so as to make available a different voltage at each of said output jacks.

16. Portable power supply carrier as defined in claim 1, wherein said output terminal means comprises:

a single output jack; and a voltage selector switch, connected by said electrical conduit means so that said selector switch can be set to apply selectively a desired voltage current to said single output jack.

17. Portable power supply carrier as defined in claim 1, further comprising input recharging terminal means connected through said electrical conduit means to said battery holders to reenergize said electrical batteries held in said battery holders, said electrical batteries being of the rechargeable type.

18. Portable power supply carrier as defined in claim 1, further comprising an electrical connecting cord capable of electrically linking said output terminal means to an electrical appliance being energized.

19. Portable power supply carrier as defined in claim 17, further comprising a recharging connecting cord capable of electrically linking said input recharging terminal means to a conventional electrical wall outlet.

* * * * *